United States Patent
Martin et al.

(10) Patent No.: US 7,430,722 B2
(45) Date of Patent: Sep. 30, 2008

(54) METHOD AND SYSTEM FOR SELECTING SKINNABLE INTERFACES FOR AN APPLICATION

(75) Inventors: Geoffrey Martin, Scotts Valley, CA (US); Janet Sailor, San Leandro, CA (US); Anthony Reyes, San Francisco, CA (US); Ruth Lim, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 627 days.

(21) Appl. No.: 10/804,989

(22) Filed: Mar. 18, 2004

(65) Prior Publication Data
US 2005/0076306 A1 Apr. 7, 2005

Related U.S. Application Data

(60) Provisional application No. 60/508,439, filed on Oct. 2, 2003.

(51) Int. Cl.
*G06F 3/00* (2006.01)

(52) U.S. Cl. .................... 715/762; 715/866; 715/764; 715/745; 715/746; 715/735; 715/744

(58) Field of Classification Search ................ 715/866, 715/962, 764, 745, 746, 747, 744, 762, 735, 715/789, 762, 735
See application file for complete search history.

(56) References Cited

U.S. PATENT DOCUMENTS

| | | | | |
|---|---|---|---|---|
| 5,535,321 A | * | 7/1996 | Massaro et al. | 715/707 |
| 5,596,702 A | * | 1/1997 | Stucka et al. | 715/746 |
| 6,262,726 B1 | * | 7/2001 | Stedman et al. | 715/745 |
| 6,342,905 B1 | * | 1/2002 | Diedrich et al. | 715/746 |
| 6,483,523 B1 | * | 11/2002 | Feng | 715/745 |
| 6,968,364 B1 | * | 11/2005 | Wong et al. | 709/217 |
| 7,086,007 B1 | * | 8/2006 | Bushey et al. | 715/762 |
| 7,174,514 B2 | * | 2/2007 | Subramaniam et al. | 715/749 |
| 2002/0130902 A1 | * | 9/2002 | Shaouy et al. | 345/745 |
| 2002/0145627 A1 | * | 10/2002 | Whitmarsh et al. | 345/745 |
| 2002/0149618 A1 | * | 10/2002 | Estrada et al. | 345/760 |
| 2003/0007003 A1 | * | 1/2003 | Ostrowski et al. | 345/746 |
| 2003/0046401 A1 | * | 3/2003 | Abbott et al. | 709/228 |
| 2003/0090516 A1 | * | 5/2003 | Stein | 345/745 |
| 2003/0126136 A1 | * | 7/2003 | Omoigui | 707/10 |
| 2003/0132970 A1 | * | 7/2003 | Lehmeier et al. | 345/789 |
| 2003/0197727 A1 | * | 10/2003 | Milius | 345/744 |
| 2004/0003347 A1 | * | 1/2004 | Saidenberg et al. | 715/511 |
| 2004/0070609 A1 | * | 4/2004 | Estrada | 345/751 |
| 2004/0216054 A1 | * | 10/2004 | Mathews et al. | 715/765 |
| 2004/0250213 A1 | * | 12/2004 | Shalabi et al. | 715/762 |
| 2005/0021935 A1 | * | 1/2005 | Schillings et al. | 713/1 |
| 2005/0044508 A1 | * | 2/2005 | Stockton | 715/811 |
| 2005/0065913 A1 | * | 3/2005 | Lillie et al. | 707/3 |

* cited by examiner

*Primary Examiner*—Dennis-Doon Chow
*Assistant Examiner*—Nicholas S Ulrich (57) ABSTRACT

A method for selecting skinnable interfaces and a system for implementing the same. The method discloses accessing user specific information upon installation of an application on a computing resource. The computing resource is associated with a user that is associated with the user specific information. The method continues by associating the user with a selected selected skin from a plurality of user interface (UI) skins. The association between the user and the selected UI skin is based on the user specific information. Thereafter, the method continues by configuring the application to display the selected UI skin as a default UI skin for the application.

24 Claims, 6 Drawing Sheets

METHOD AND SYSTEM FOR SELECTING SKINNABLE INTERFACES FOR AN APPLICATION

RELATED U.S. APPLICATIONS

This application claims priority to the co-pending provisional patent application, Ser. No. 60/508439, entitled "A Novel Customizable User Interface For One Click Access To Local And Online Contents," with filing date Oct. 2, 2003, and assigned to the assignee of the present invention.

TECHNICAL FIELD

The present invention relates to the field of user interfaces, and more particularly to a method and system for selecting a partner specific skinnable user interface for an application.

BACKGROUND ART

A single application that is loaded onto multiple computing systems can have user interfaces that are tailored to specific business partners. That is, the user interface of the application is configured specifically with the business partner in mind. For example, on one computing system the application is tailored to have a user interface that is associated with business partner A. In another example, in another computing system, the same application is tailored to have a user interface that is associated with business partner B.

In conventional systems, the user interface is typically built or configured to the application when the computing system is manufactured. This requires that the selected business partner be known prior to the manufacture of the computing resource. That is, the user interface is statically associated with the selected business partner. In other words, the user interface of the application cannot be changed and its association with the selected business partner is static. This poses a problem whenever a computing system with an application that has a user interface tailored to one business partner has need to change the user interface so that is tailored to another business partner.

To allow for selection between multiple user interfaces for a single application on a particular computing system, prior art solutions created several similar but distinctive applications that are installed on the computing system. Each of the distinctive applications has a user interface that is tailored to a distinctive business partner. For example, one application has a user interface that is tailored to business partner A, and another application that provides the same functionality has a user interface that is tailored to business partner B, etc. All of the various applications that perform the same functionality are installed and shipped on the same computing system. Thereafter, at run-time, only one application is selected to run and remain on the computing system, after it is determined which business partner is selected. The remaining applications that are tailored to business partners that were not selected are then uninstalled.

For instance, a computing resource may come equipped with several browsers as a user interface. Each of the browsers is tailored to a different business partner. For example, the business partners may be retailers from which a user of the computing resource purchased the computing resource. As such, although the browsers each provide the same basic browsing functionality, they are distinct from each other in that each browser may look different and provide default links that correspond to an associated business partner. In this way, the retailer/customer relationship can be further established between a business partner and the user.

The disadvantage to this approach is that for one application, unnecessary duplication of code is necessary to potentially service a plurality of business partners. That is, multiple applications each providing the same functionality and each tailored to a separate business partner are installed on the same computing system when only one application is retained and allowed to run at run-time for the computing system. This approach promotes a wasteful use of computing resources (e.g., memory) that can be used for storing other applications, especially when some or most of the computing resources will be freed when one application is selected and the remaining applications are uninstalled.

Therefore, prior art methods inefficiently used computing resources to allow for tailoring an application that provided a particular functionality to a selected business partner from multiple business partners.

DISCLOSURE OF THE INVENTION

A method for selecting skinnable interfaces and a system for implementing the same. The method discloses accessing user specific information upon installation of an application on a computing resource. The computing resource is associated with a user that is associated with the user specific information. The method continues by associating the user with a selected selected skin from a plurality of user interface (UI) skins. The association between the user and the selected UI skin is based on the user specific information. Thereafter, the method continues by configuring the application to display the selected UI skin as a default UI skin for the application.

BEST MODES FOR CARRYING OUT THE INVENTION

Reference will now be made in detail to the preferred embodiments of the present invention, a method and system of selecting partner specific user interfaces for an application. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention can be implemented on software running on a computer system. The computer system can be a personal computer, notebook computer, server computer, mainframe, networked computer, handheld computer, personal digital assistant, workstation, and the like. This software program is operable for allowing an application to dynamically change its user interface (UI) to match a selected business partner. In one embodiment, the computer system includes a processor coupled to a bus and memory storage coupled to the bus. The memory storage can be volatile or non-volatile and can include removable storage media. The computer can also include a display, provision for data input and output, etc.

Accordingly, the present invention discloses a method and system of selecting a partner specific user interface for use in an application. Specifically, embodiments of the present invention disclose a method for an application to dynamically change its UI to match a selected business partner. That is, embodiments of the present invention are capable of selecting partner specific skins based on business logic information that associates a user with a business partner to tailor the look and feel of an otherwise general application. Because the partner specific UI is selected at run time of the application, the application is configurable to multiple business partners without separately creating and installing distinctive application that are installed and shipped on the same computing system when only one application will be chosen. More specifically, embodiments of the present invention are able to utilize user specific information to determine which UI resources (e.g., strings, graphics, layouts, etc.) are used to create the partner specific UI for the application. As a result, the same base application is able to exhibit distinctive and unique UIs that are optimized to favor a selected business partner.

Figure 1:
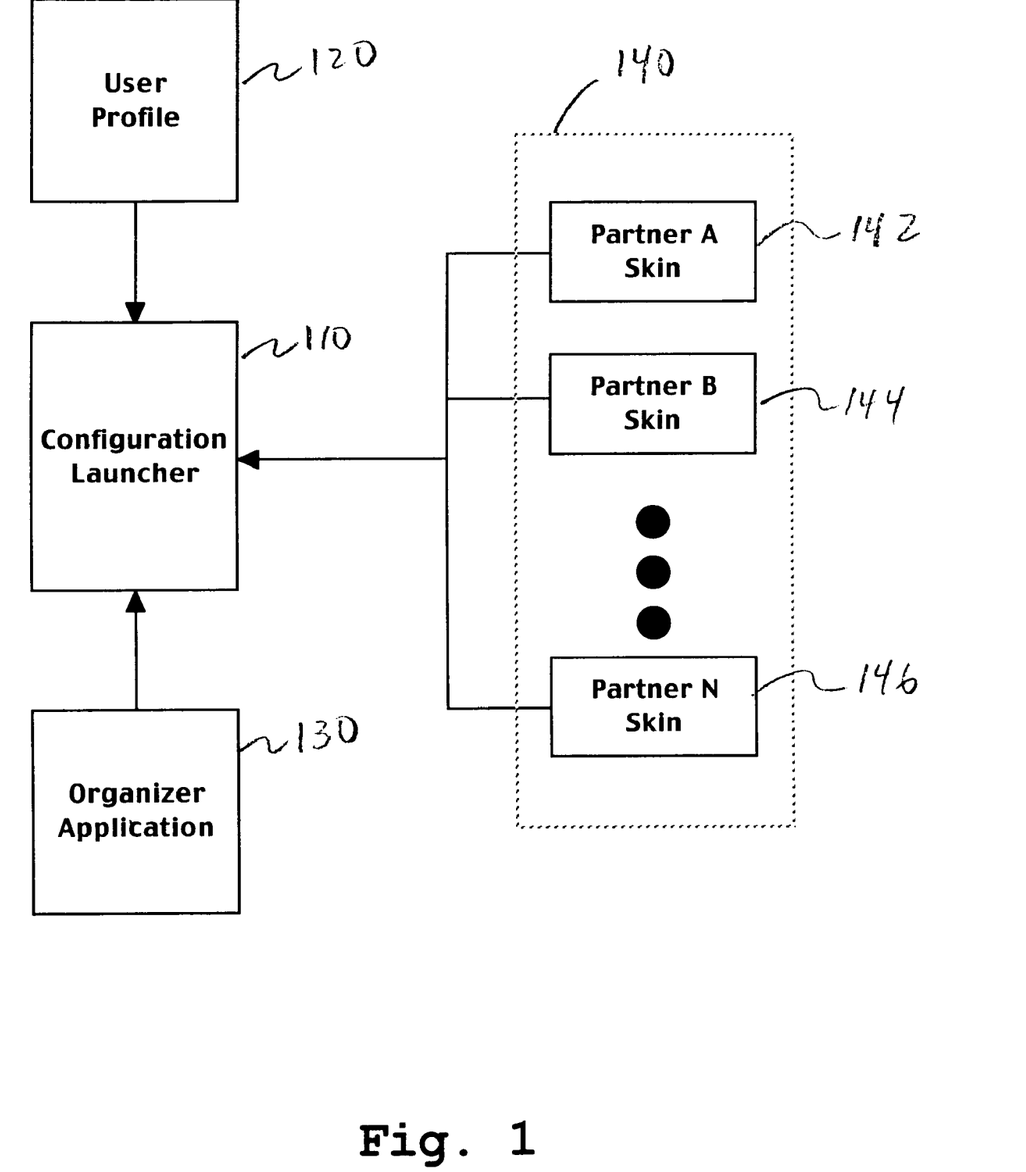
FIG. 1 is a block diagram of a system that is capable of selecting a partner specific skinnable interface for use within an application, in accordance with one embodiment of the present invention.

Now referring to FIG. 1, a block diagram illustrates a system 100 that is capable of selecting a partner specific UI for use within an application (e.g., an exemplary organizer application 130), in accordance with one embodiment of the present invention. As shown in FIG. 1, a configuration launcher 110 performs the functions to make an association between a user and a selected business partner in order to select and generate a skin that is the UI for an application. The skin that is selected and generated is associated with the selected business partner. That is, the skin that is selected and generated is tailored to promote the selected business partner's interests, such as providing a platform for the business partner to promote its goods or services.

Although embodiments of the present invention are presented within the context of selecting a partner specific UI for an application, other embodiments are well suited to the selection of any type of UI for an application based on the user specific information. For example, the UI may be tailored to or present varying types of selectable brands for brand differentiation, or various types of holidays selected based on user specific information (e.g., current date of running the application by the user), or various types of activities based on a user's personal interests (e.g., boating), etc.

The configuration launcher 110 retrieves a user profile that contains user specific information. For example, the user specific information may disclose from which retailer a user purchased the computing resource that is executing the associated application. In that way, an association between the user, the user's computing resource, and a particular retailer is made. The retailer can be a business partner to which an application (e.g., the exemplary organizer application 130) on the computing resource is tailored.

The configuration launcher 110 is capable of selecting between a plurality of skinnable UIs 140. That is, each of the plurality of skins 140 provide a UI to a particular business partner. For example, the partner A skin 142 provides a skinnable UI that is associated with business partner A; partner B skin 144 provides a skinnable UI that is associated with business partner B; on up to the partner N skin 146 that provides a skinnable UI that is associated with business partner N.

The selected skin UI is chosen based on the association determined by the configuration launcher 110 between a user and the selected business partner, in one embodiment. Other embodiments are well suited for selection of skinnable UI based on any selection factors. These skinnable UIs in the plurality of UIs 140 provide a base UI from which a customized UI can be generated for the user and the selected business partner based on information partly contained in the user profile 120, in one embodiment.

After the selected business partner is determined by the configuration launcher 110 and the associated partner skin is selected from the plurality of skinnable UIs 140, the configuration launcher is capable of configuring the application 130 to use the selected UI as its user interface. Moreover, the configuration launcher 110 may further customize the selected UI depending on information gathered, such as information gathered from the user profile, etc.

While embodiments of the present invention are disclosed within the context of an exemplary organizer application, other embodiments are well suited to implementing partner specific skinnable interfaces for any type of application.

Figure 2:
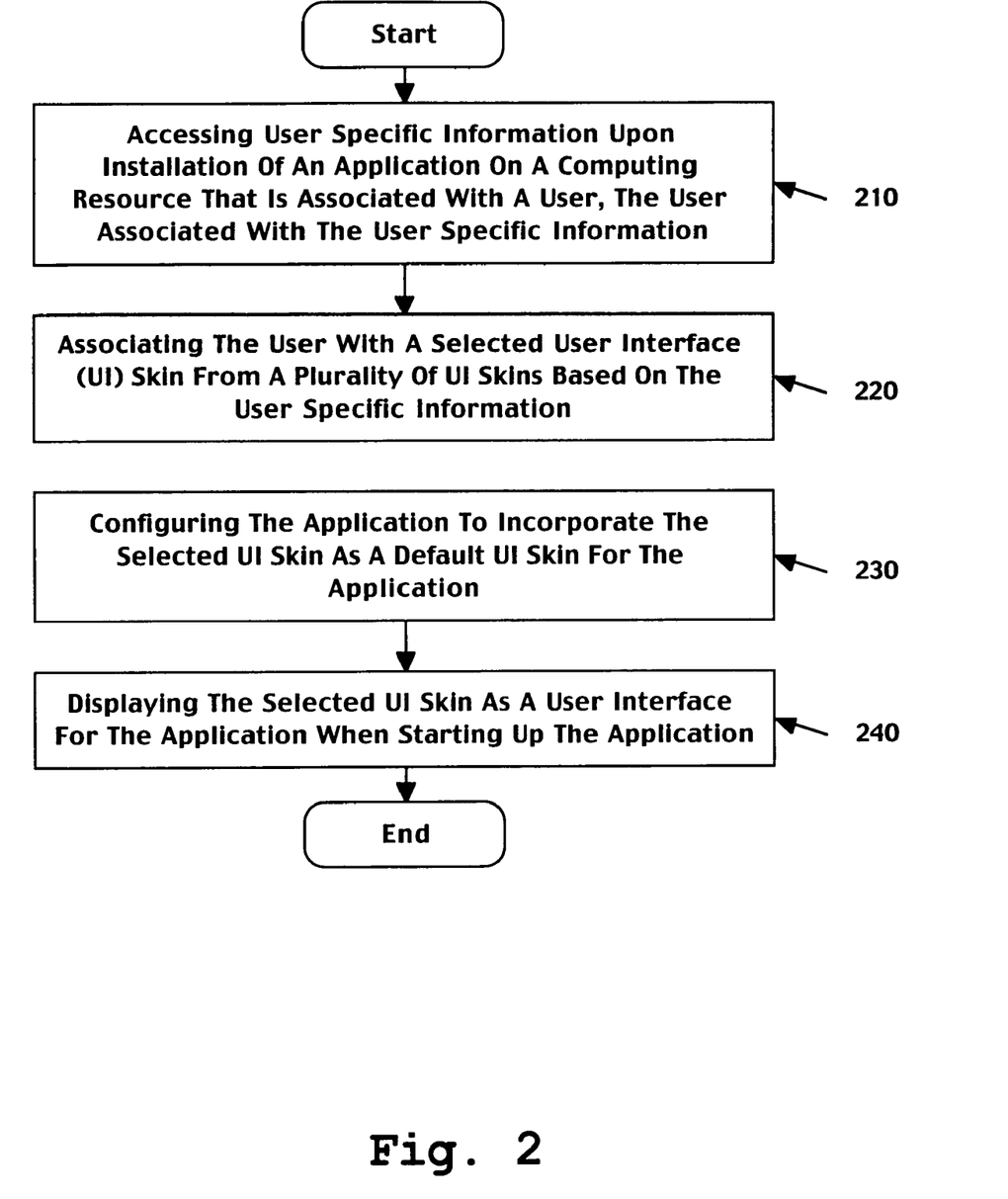
FIG. 2 is a flow diagram illustrating steps in a computer implemented method for selecting a partner specific skinnable interface for use within an application, in accordance with one embodiment of the present invention.

Now referring to FIG. 2, a flow diagram 200 illustrates steps in a computer implemented method for selecting a skinnable interface, in accordance with one embodiment of the present invention. The present embodiment is capable of generating a user interface for an application such that separate and distinct applications for each business partner need not be installed on the computing system.

In one embodiment, the UI is tailored to affiliated business partners. That is, deciding the exact look and feel of the UI at run time provides for the installation of one application that can be tailored to multiple business partners that can be associated with a user. As a benefit, this reduces the amount of redundant code needed to be generated and stored since multiple applications need not be generated, and allows developers to derive new partner specific code from a base platform code by simply replacing resources and data files as opposed to developing independent UI code.

Other embodiments are well suited to UIs tailored to other types of associations to the user, as described previously. For example, the selected UI can be tailored to a particular brand, a holiday, personal interests, etc.

At 210, the present embodiment begins by accessing user specific information upon installation of an application on a computing resource. The computing resource is associated with a user, and correspondingly, the user is associated with the user specific information. As previously discussed, the user specific information can be read or accessed from a user profile that is stored on the computing resource. Other embodiments are well suited accessing the user specific information through other means, such as querying the user for the user specific information, or accessing product registration information.

At 220, the present embodiment continues by associating the user with a selected UI skin from a plurality of UI skins based on the user specific information. That is, it can be determined from the user specific information which UI skin has an association with the user. In that way, the UI skin can be tailored to the user.

In one embodiment, the user is associated with a selected business partner from a plurality of business partners based on the user specific information. That is, an association is made between the user and a selected business partner such that a UI can be selected and generated that is tailored to the specific business partner. For example, the user specific information may contain the user name, user address, and other identifying information. In addition, the user specific information may contain behavioral logic information that may create an association between the user and the selected business partner. For instance, the behavioral logic information may indicate from which retailer the user purchased the computing resource upon which the application is operating. In that case, an association can be made in which the user is a customer of the selected business partner, the retailer from which the user purchased the computing resource.

In this case, the present embodiment would determine the selected UI skin from the plurality of UI skins based on the selected business partner. That is, the plurality of UI skins is associated with the plurality of business partners. As such, each of the UI skins is tailored or associated with a particular business partner. As such, determining the selected UI skin can be made based on which business partner is selected, or which business partner has an association with the user.

In another embodiment, after the selected UI skin is determined, the remaining UI skins in the plurality of UI skins are deleted. As such, the selected UI skin is the only skin loaded when installing the application onto the computing resource.

At 230, the present embodiment continues by configuring the application to incorporate the selected UI skin as a default UI skin for the application. That is, in one embodiment, the selected UI skin provides a default platform from which a customized UI is generated for the application. That is, additional features and customizations are incorporated into the selected UI skin for use with the application. These additional features and customizations can be automatically generated based on the user specific information, or generated by the user. In another embodiment, the selected UI skin is sufficient to function as a UI for the application.

At 240, the present embodiment continues by displaying the selected UI skin as a user interface for the application when running the application. As stated previously, the selected UI skin may be further customized to the user based on the user specific information.

Figure 3:
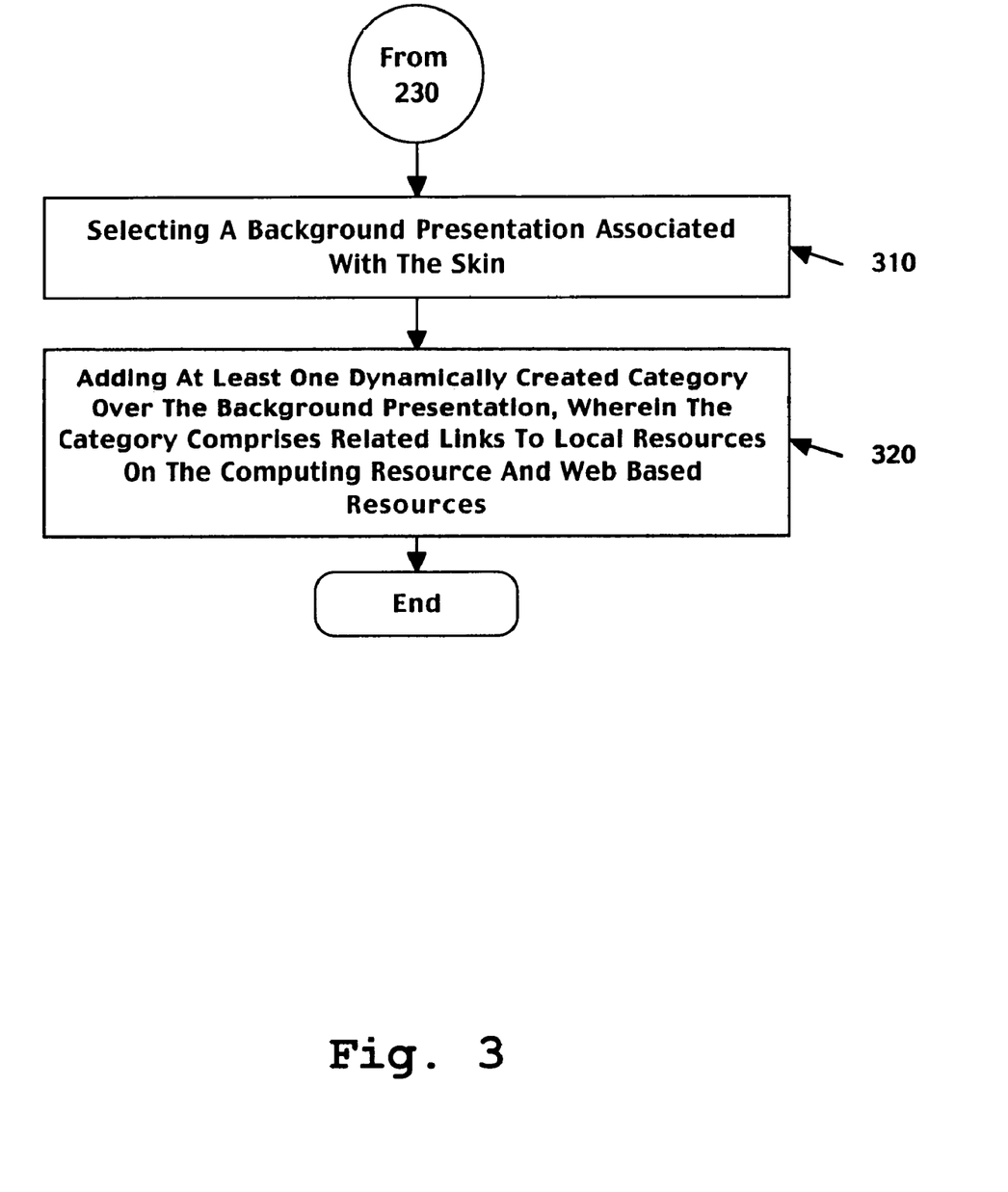
FIG. 3 is a flow diagram illustrating steps in a computer implemented method for configuring an application to incorporate a partner specific skinnable interface, in accordance with one embodiment of the present invention.

FIG. 3 is a flow diagram 300 illustrating steps in a computer implemented method for generating the selected UI skin that is associated with the selected business partner, wherein the selected business partner is associated with the user, in accordance with one embodiment of the present invention. FIG. 3 is a further illustration of the operation described in 230.

The present embodiment begins by selecting a background presentation that is associated with the UI skin, at 310. In one embodiment, the background presentation is an image presented in a bitmap form within a window on a desktop that is displayed. The background presentation provides a platform from which the UI can be generated. The background presentation is designed and tailored to promote the interests of the selected business partner. For example, the background presentation can be a company logo for purposes of brand differentiation that is provided in the background of the UI for the application, as will be described below in relation to FIG. 4.

In one embodiment, the selected background presentation can be automatically updated. That is, through various means, the background presentation that is stored on the local computing resource may be updated or replaced, either through direct user interaction, or through indirect web interaction through a third party, such as from the selected business partner. In this way, the selected business partner may update or change the background presentation displayed to the user through the application in the UI skin.

At 320, the present embodiment continues by adding at least one category over the background presentation. The category is dynamically created based on the user specific information. In addition, the category comprises related links to local resources that are located on the computing resource, as well as web based resources found over the Internet. As a result, in one embodiment, the category or categories on the background bitmap image provide for a UI that is tailored to a specific business partner.

The UI for the application is configured in a web page format, in one embodiment. For example, in one implementation, the application comprises a local portal for accessing local and web based resources.

In another embodiment, the links in the categories can be automatically updated. That is, through various means, the links in the category that provide access to local and web based resources may be updated or replaced, either through direct user interaction, or through indirect web interaction through a third party, such as from the selected business partner. In this way, the selected business partner may update or change the links presented to the user through the application in the UI skin.

Figure 4A:
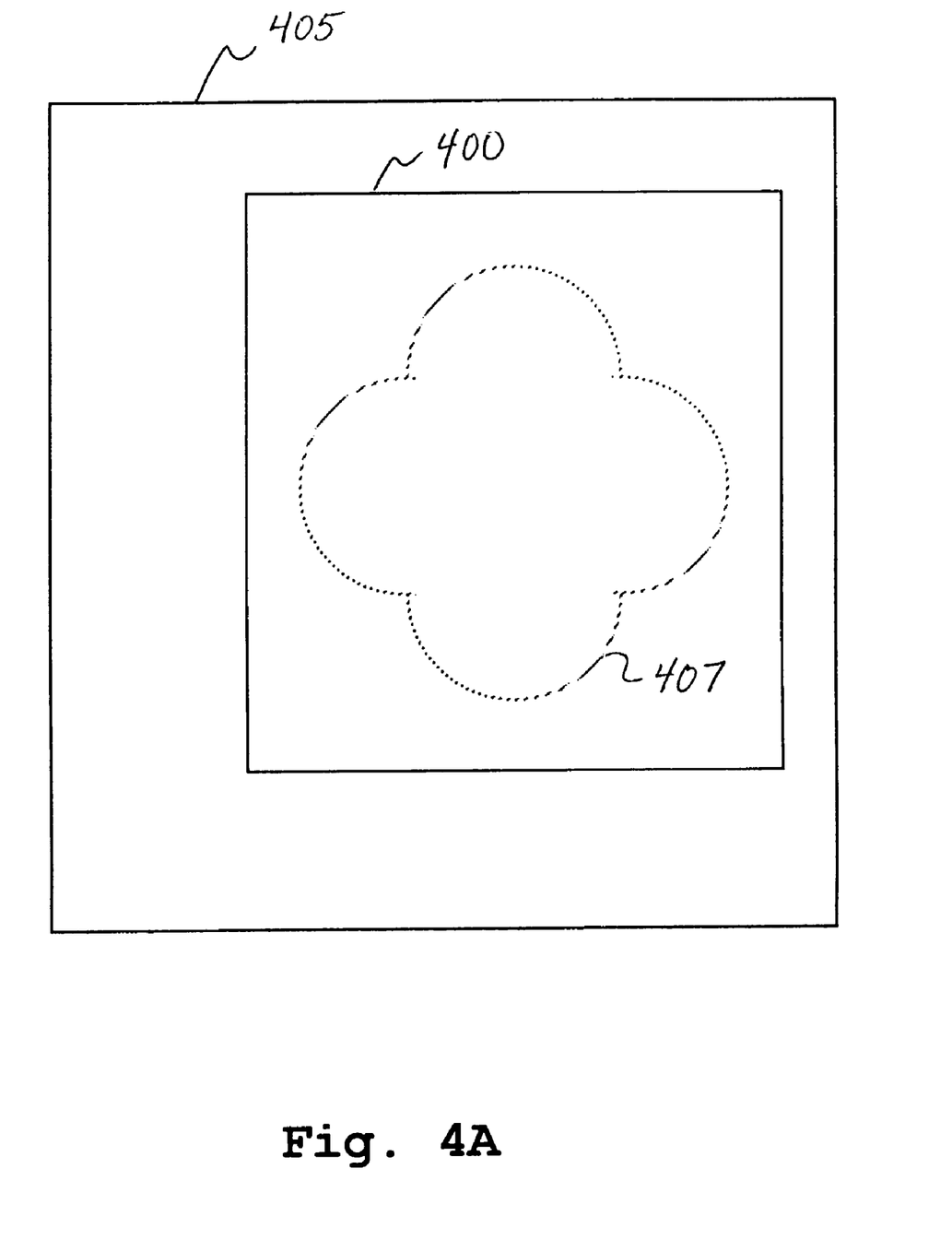
FIG. 4A is a diagram illustrating a monitor displaying a background bitmap image that is associated with a selected business partner, in accordance with one embodiment of the present invention.

Now referring to FIG. 4A, a block diagram of a display 405 illustrates the formation of a background presentation 407 for an application running on a computing system, in accordance with one embodiment of the present invention. As described previously, the background presentation 407 is presented in a window 400 on the display 405. That is, the window 400 is presented on or within the desktop presentation on the display 405.

In one embodiment, the background presentation 407 in the window 400 is presented as an image in a bitmap format. The bitmap represents information in the form of a collection of individual bits, and is used to represent a bit image. In this way, an image, such as the background presentation 407 can be generated and presented as a background of a UI to an application. The background presentation 407 can be designed in any shape and can be used to promote the interests of a selected business partner, as described previously in relation to FIG. 2. For example, the background presentation 407 can be a company logo, or flag, etc.

In one embodiment, the background presentation 407 comprises a plurality of colors, wherein one of the colors indicates a transparent color. That is, in those areas with the transparent color in the background presentation 407, the colors of the layer underneath the background presentation 407 are shown. In this way, using the versatility of the numerous bits in the bitmap, virtually any shape of image can be displayed.

In one embodiment, the background presentation 407 is presented in a skinnable format. That is, the background presentation is associated with a selected skin chosen from a plurality of skins, wherein the plurality of skins is associated with a plurality of business partners, in one embodiment. In other embodiments, the plurality of skins is associated with other associations to the user, such as, personal interests, holidays, etc. Determining the selected skin is based on user specific behavioral logic that associates a user with the selected business partner, as described previously. The user specific behavioral logic is obtained or accessed during installation of the application on the computing resource.

Figure 4B:
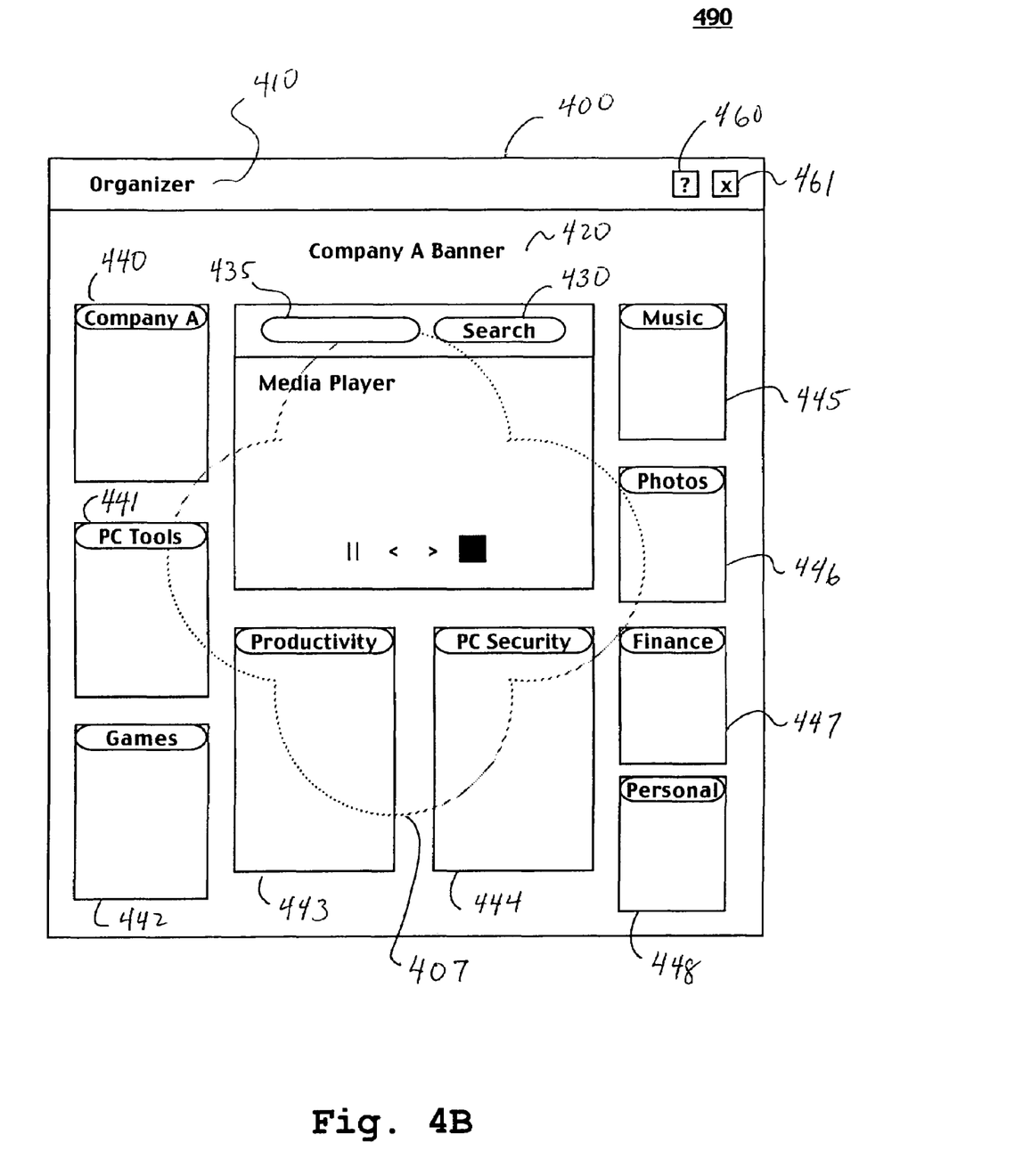
FIG. 4B is a diagram illustrating an exemplary application that is configured to display a partner specific user interface, in accordance with one embodiment of the present invention.

FIG. 4B provides an illustration of the window 400 of FIG. 4A which contains the partner specific UI 490 for the application. In the present case, the application is an exemplary organizer application that provides a shortcut interface to access local and web based resources. The UI 490 is tailored to the selected business partner that is associated with the user. For example, the UI 490 within the window is created on the background presentation 407 that is shown both in FIGS. 4A and 4B, where the background presentation 407 is associated with a selected business partner.

Moreover, the UI 490 provides for means to promote the selected business partners interests. For instance, in one embodiment, the UI 490 provides space for the selected business partner to prominently display their name, or to advertise their name in the banner 420.

The UI 490 provides an interface for an application, such as the exemplary organizer application as labeled in bar 410. Bar 410 also provides interface buttons, such as the close button 461 and the help button 460. The user interacts with the UI 490 to implement the exemplary organizer application. For instance, the UI 490 provides an interface for a media player 450 within which the user may access various forms of media, such as, photos, music, etc. In the case of photos, the media player may cycle through a file folder of digitized photos to display the photos continuously. In the case of music, the media player may act as a music player to play or record music using various digital audio formats. Also, in block 435, a search function 430 can be implemented that provides a link to a search engine for accessing content over the Internet.

The UI 490 also includes at least one category layered on the background presentation 407. More specifically, the categories that are layered on the background presentation 407 together with the background presentation 407 comprise the partner specific UI 490 for an associated application, such as the exemplary organizer application. For instance, the categories in the UI 490 include the following: selected business partner (Partner A) 440; PC tools 441; Games 442; Productivity 443; PC Security 444; Music 445; Photos; 446; Finance 447; and Personal 448.

Each of the categories comprise related links to resources that contain applications, information, data, etc. The resources are located on the local computing resource or on web based providers. As such, the categories each comprise related links to local resources on the computing resource and web based resources in a web page format, as will be described more fully below. The links may be user defined or predefined by others, such as the selected business partner.

Figure 5:
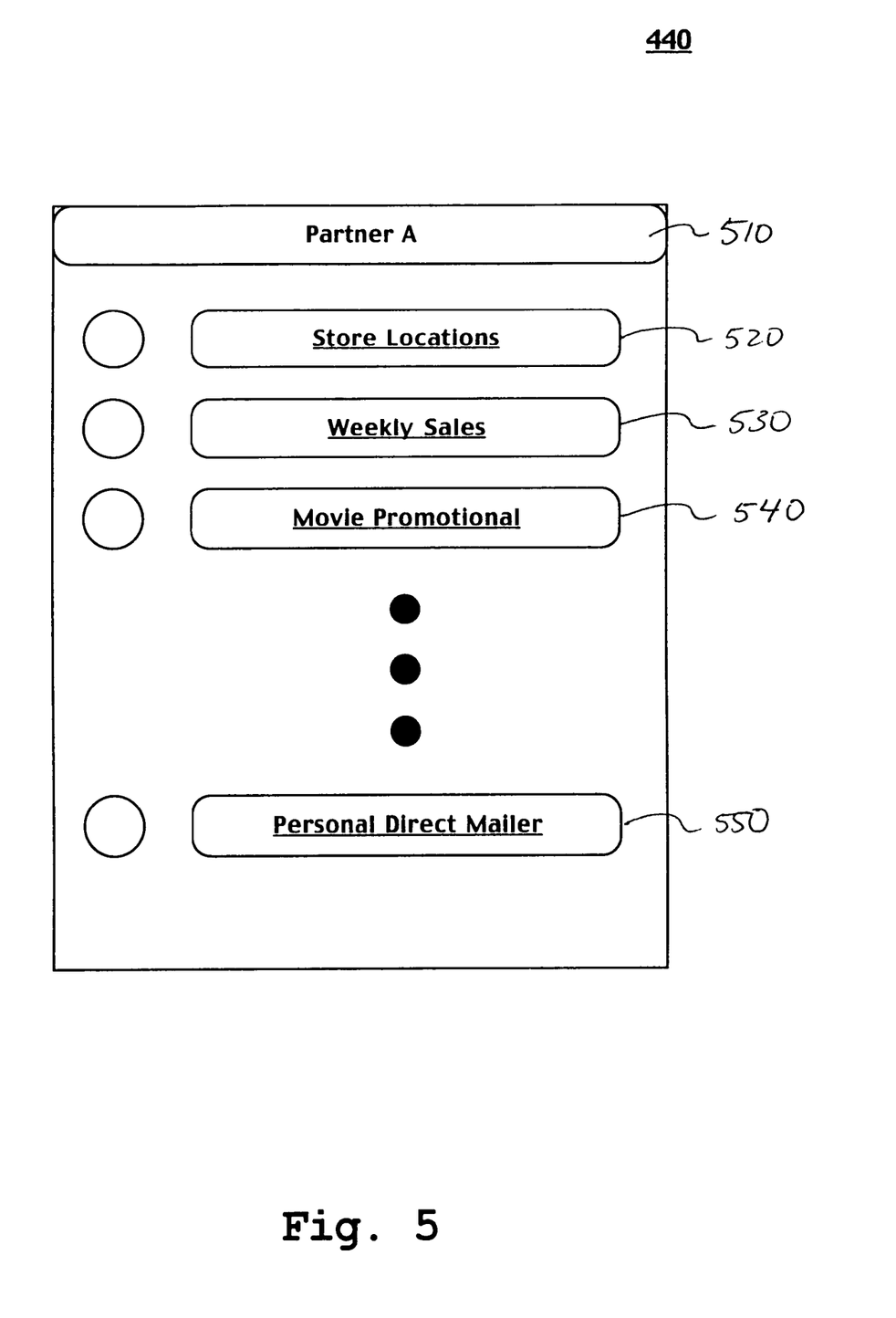
FIG. 5 is a diagram illustrating a category of a partner specific skinnable interface, in accordance with one embodiment of the present invention.

For instance, the "Partner A" category 440 may contain information about business partner A, such as how to contact them, or promotional retail deals of the week, as will be more fully described in relation to FIG. 5. Also, the "PC Tools" category 441 may contain localized or web based applications that help to troubleshoot the computing resource. In addition, the "Games" category 442 may contain direct links to on-line gaming sites, or to gaming application loaded on the computing resource. The "Productivity" category 443 may contain links to localized word-processing applications, web browser launcher, e-mail access, calendar, web based links, such as, financial brokerage links, etc. The "PC Security" category 407 may provide links to local or web based applications that help secure the PC from viruses. The "Music" category 445 may contain links to music files on the local computer or the web. The "Photos" category 446 may contain links to files that contain digital photos. The "Finance" category 447 may contain links to accounting application on the local computer or to brokerage links on the web. The "Personal" category 448 may contain links to personally selected files, applications, or links.

One of the benefits to the exemplary organizer application allows for revenue sharing, in one embodiment of the present invention. That is, whenever, one of the links provided on the UI 490 is selected, engaged, or activated, revenue sharing can be implemented between companies associated with the activation of the link. For instance, if a user activated the search function 430, the UI 490 may link the user to a particular search engine that displays advertisements, from which the search engine can provide some revenue sharing to various related partners, such as, the manufacturer of the computing resource, or the manufacturer of the exemplary organizer application, etc.

The UI 490 is presented depending on the configuration selected that is controlled by the user. In one embodiment, the partner specific UI 490 is displayed upon starting the application. That is, when the application is run on the computing resource, the UI 490 that is specific to and associated with the selected business partner that is associated with the user is presented as the UI for the application. In this case, the UI 490 is the default display for the application as controlled by the user.

In another embodiment, after initial set up of the application is completed, on subsequent reboots of the computing resource, the computing resource automatically launches the partner specific UI 490. That is, when the computing resource is initially started, the partner specific UI 490 is prominently displayed on the desktop coupled to the computing resource. As such, the UI 490 is the first thing that the user views upon booting up the computing resource, which allows the user to immediately access the application through the UI 490. In this case, the UI 490 acts as a default display for the application as controlled by the user.

In addition, although the present embodiment illustrates particular categories, other embodiments of the present invention are well suited to any number and any type of category. In addition, the categories can be default categories predetermined for the user. The default categories can be selected based on user specific information, and pre-populated with information or links based on the user specific information. In addition, the categories can be user selected, and populated with information or links based on personal preference.

FIG. 5 is a diagram illustrating an exemplary category on a UI that is comprised of a partner specific skinnable interface, in accordance with one embodiment of the present invention. In the present embodiment, the category 440 from the UI 490 is shown. The category 440 is titled the "Partner A" category as shown in bar 510.

In one embodiment, within the category 440 various links are provided to local resources on the local computing resource, and to web based resources. Some of the links promote the interests of Partner A, which is the selected business partner that has an association with the user, such as a customer/retailer association. For example, link 520 may provide the store locations of Partner A. That is, when activating the link 520, the web browser is coupled to a server that manages information related to store locations for Partner A. In link 530, the user may be provided access to a web site that contains weekly sales for Partner A. In this way, the Partner A can continuously promote its weekly sales through the exemplary organizer application.

In addition, in another example, link 540 may provide access to a web site promoting a movie that is being produced or sold by Partner A. That is, by linking to link 540, a user can view the promoted movie, or be given access to a site that allows the user to purchase the movie. Various other links can be provided, including an exemplary "Personal Direct Mailer" link 550 that gives the user access to information that is tailored to the user. For instance, Partner A may provide the user with specific promotional deals that Partner A that are of interest to the user, such as special promotional air fare deals to frequent flyers, etc.

In one embodiment, information provided in each of the categories in the UI 490, such as in category 440 is provided in a Extensible Markup Language (XML) format. Other embodiments are well suited to other formats suitable for placing and locating categories within the background presentation. For instance, the XML file provided for category 440 indicates the UI resources (e.g., strings, graphics, layouts, etc.) to use in order to locate and present the category 440 over the background presentation 407. In this way, UI logic can be selected and tailored at installation of an application, based on information (e.g., behavioral logic of the user). In this way, a UI with categories can be tailored to a specific business partner and user.

While the methods of embodiments illustrated in flow charts 200 and 300 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

The preferred embodiments of the present invention, a method and system for providing a partner specific user interface for an application, is thus described. While the present invention has been described in particular embodiments, it should be appreciated that the present invention should not be construed as limited by such embodiments, but rather construed according to the below claims.

What is claimed is:

1. A method for selecting skinnable interfaces comprising:
    accessing user specific information upon installation of an application on a computing resource that is associated with a user, said user associated with said user specific information;
    determining a selected user interface (UI) skin from a plurality of UI skins based on said user specific information;
    configuring said application to incorporate said selected UI skin as a default UI skin for said application;
    wherein said user specific information comprises behavioral logic available on said computing resource, said behavioral logic associating said user to said selected UI skin;
    wherein said selected UI skin is associated with a selected business partner chosen from a plurality of business partners based on said user specific behavioral logic, and wherein said plurality of UI skins is associated with said plurality of business partners;
    wherein said user specific behavioral logic associates a user as a customer of said selected business partner; and
    wherein said user purchased said computing resource from said selected business partner.

2. The method of claim 1, further comprising:
    providing revenue sharing from said selected business partner.

3. The method of claim 1, wherein said determining a selected UI skin further comprises:
    associating said user with a selected type from a plurality of types based on said user specific information, wherein said plurality of types is associated with said plurality of skins; and
    determining said selected UI skin based on said selected type.

4. The method of claim 1, further comprising:
    displaying said selected UI skin as a user interface for said application when running said application.

5. The method of claim 1, wherein said application comprises a local portal for accessing local resources on said computing resource and web based resources.

6. The method of claim 1, wherein said configuring said application further comprises:
    selecting a background presentation associated with said UI skin; and
    adding at least one category that is dynamically defined based on said user specific information over said background presentation, wherein said category comprises related links to local resources on said computing resource and web based resources.

7. The method of claim 1, wherein said accessing user specific information further comprises:
    accessing product registration information to access said user specific information.

8. The method of claim 1, wherein said accessing user specific information further comprises:
    querying said user for said user specific information upon installation of said application.

9. The method of claim 1, further comprising:
    loading only said selected UI skin when installing said application onto said computing resource.

10. The method of claim 1, further comprising:
    dynamically updating said selected UI skin.

11. A business partner specific user interface on a computer, comprising:
    a background presentation comprised of a bitmap image formed within a window on said computer as background to a user interface application, wherein said background presentation is associated with a selected skin chosen from a plurality of skins based on user specific behavioral logic, wherein said user specific behavioral logic is obtained during installation of an application on a computing resource; and
    at least one category that is dynamically defined based on said user specific behavioral logic and that is added to said background presentation in said selected skin for said user interface application, wherein said category comprises related links to local resources on said computing resource and web based resources;
    wherein said selected UI skin is associated with a selected business partner chosen from a plurality of business partners based on said user specific behavioral logic, and wherein said plurality of UI skins is associated with said plurality of business partners;
    wherein said user specific behavioral logic associates a user as a customer of said selected business partner; and wherein said user purchased said computing resource from said selected business partner.

12. The business partner specific user interface of claim 11, wherein said category comprises an XML file for adding said category in said background presentation.

13. The business partner specific user interface of claim 11, wherein said selected skin is displayed upon starting said application.

14. The business partner specific user interface of claim 11, wherein said user interface application is started upon boot up of said computing resource.

15. A computer system comprising:
a processor;
a computer readable memory coupled to said processor and containing program instructions that, when executed, implement a method for selecting skinnable interfaces comprising:
accessing user specific information upon installation of an application on a computing resource that is associated with a user, said user associated with said user specific information;
determining a selected user interface (UI) skin from a plurality of UI skins based on said user specific information; and
configuring said application to incorporate said selected UI skin as a default UI skin for said application;
wherein said user specific information comprises behavioral logic available on said computing resource, said behavioral logic associating said user to said selected UI skin;
wherein said selected UI skin is associated with a selected business partner chosen from a plurality of business partners based on said user specific behavioral logic, and wherein said plurality of UI skins is associated with said plurality of business partners;
wherein said user specific behavioral logic associates a user as a customer of said selected business partner; and
wherein said user purchased said computing resource from said selected business partner.

16. The computer system of claim 15, wherein said method further comprises:
providing revenue sharing from said selected business partner.

17. The computer system of claim 15, wherein said determining a selected UI skin in said method further comprises:
associating said user with a selected type from a plurality of types based on said user specific information, wherein said plurality of types is associated with said plurality of skins; and
determining said selected UI skin based on said selected type.

18. The computer system of claim 15, wherein said method further comprises:
displaying said selected UI skin as a user interface for said application when running said application.

19. The computer system of claim 15, wherein said application comprises a local portal for accessing local resources on said computing resource and web based resources.

20. The computer system of claim 15, wherein said configuring said application in said method further comprises:
selecting a background presentation associated with said UI skin; and
adding at least one category that is dynamically defined based on said user specific information over said background presentation, wherein said category comprises related links to local resources on said computing resource and web based resources.

21. The computer system of claim 15, wherein said accessing user specific information in said method further comprises:
accessing product registration information to access said user specific information.

22. The computer system of claim 15, wherein said accessing user specific information in said method further comprises:
querying said user for said user specific information upon installation of said application.

23. The computer system of claim 15, wherein said method further comprises:
loading only said selected UI skin when installing said application onto said computing resource.

24. The computer system of claim 15, wherein said method further comprises:
dynamically updating said selected UI skin.

* * * * *